UNITED STATES PATENT OFFICE.

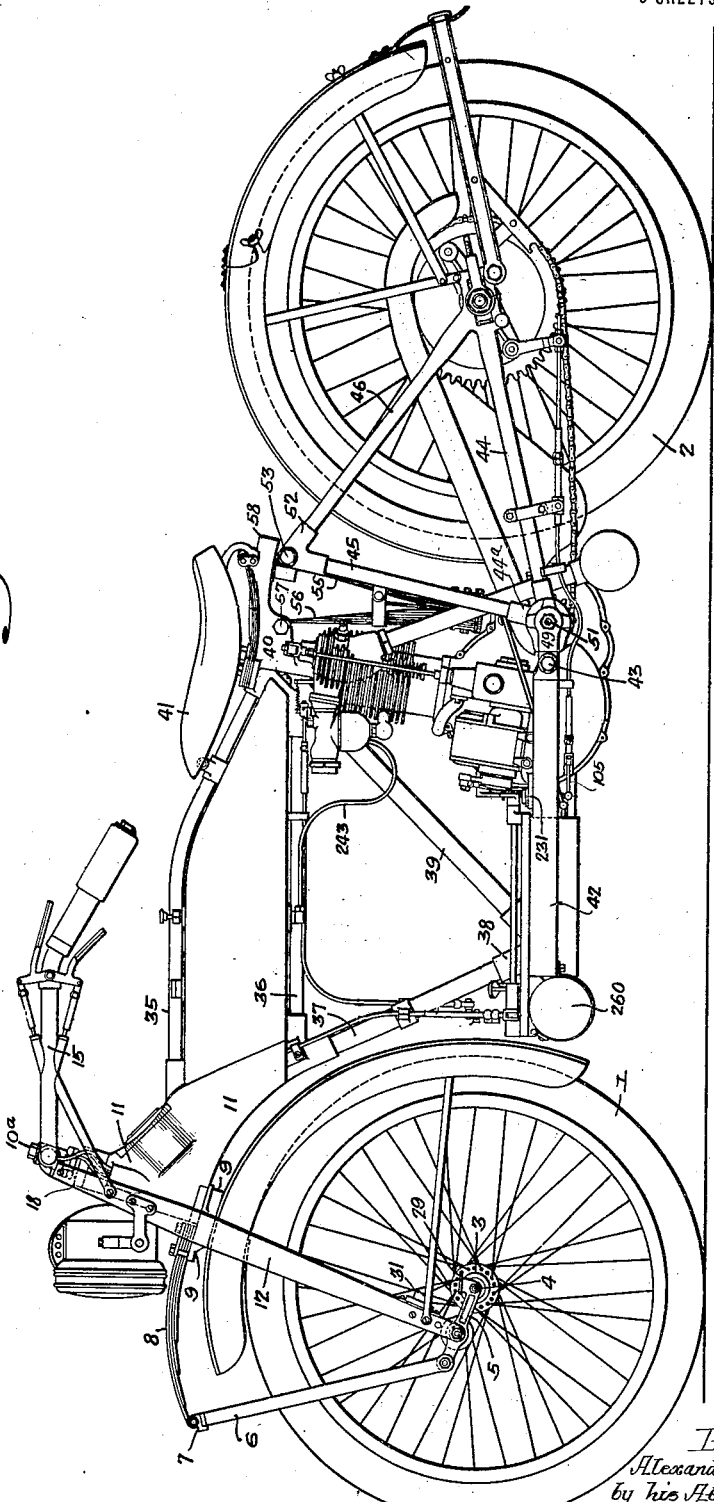

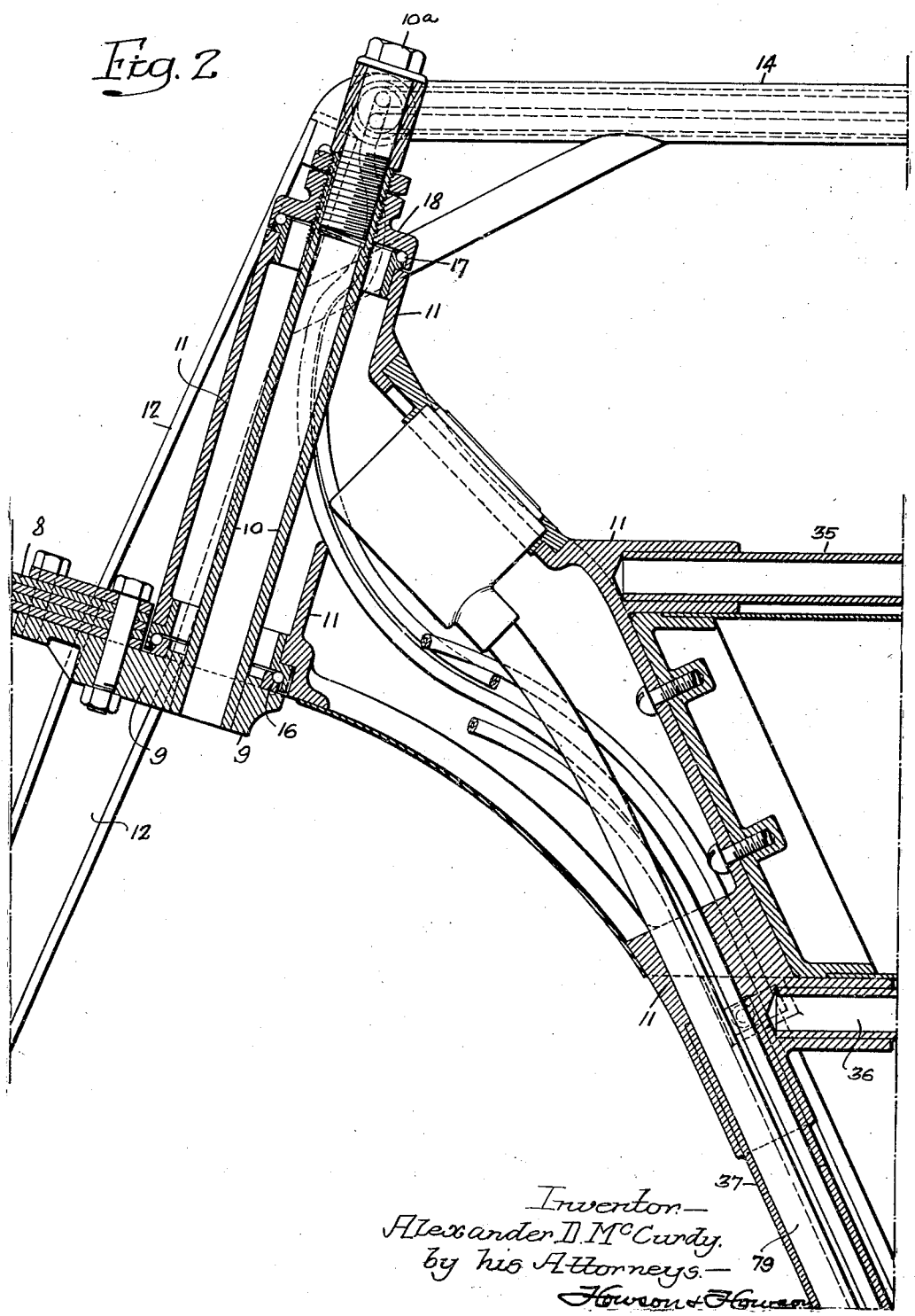

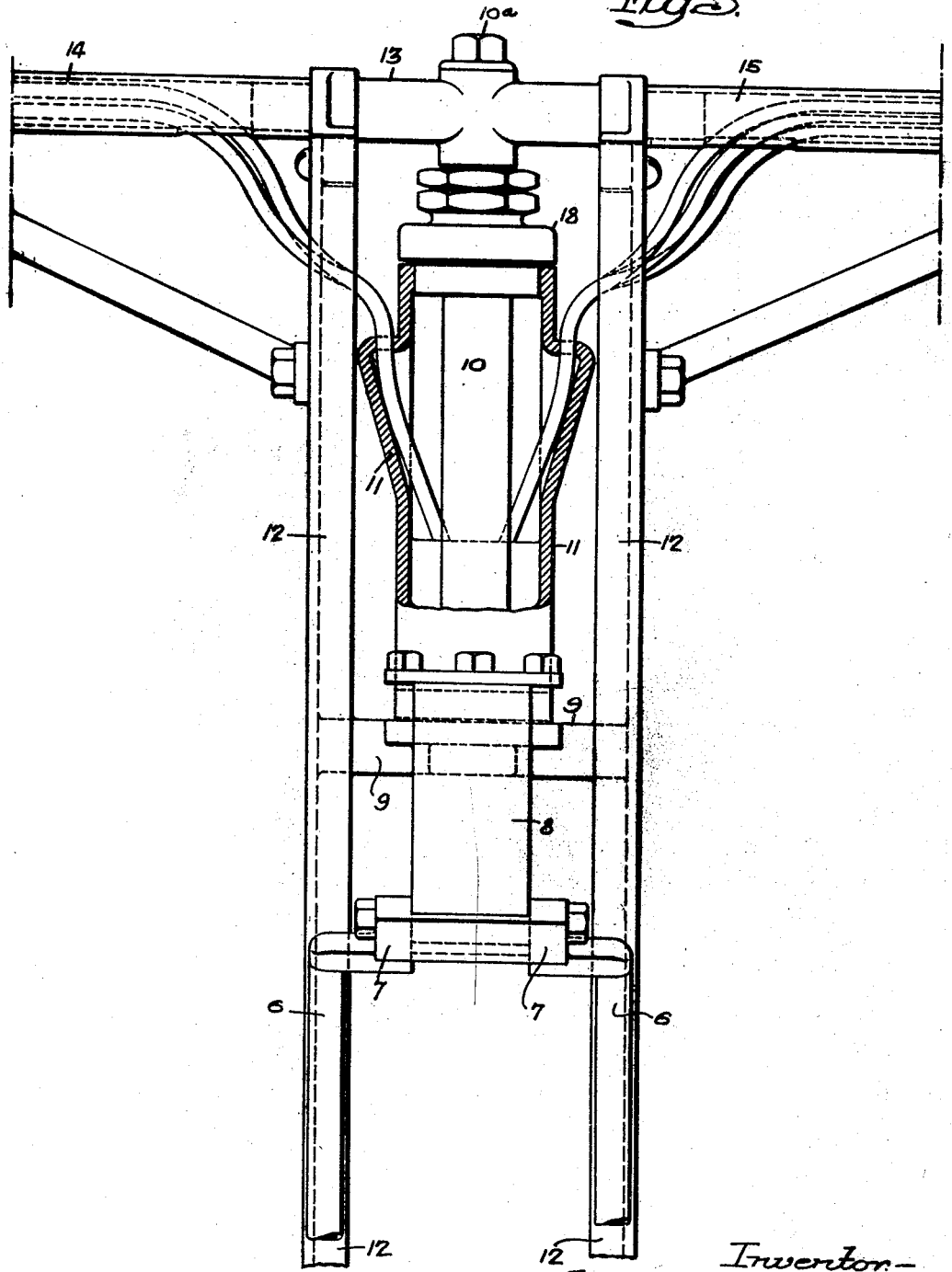

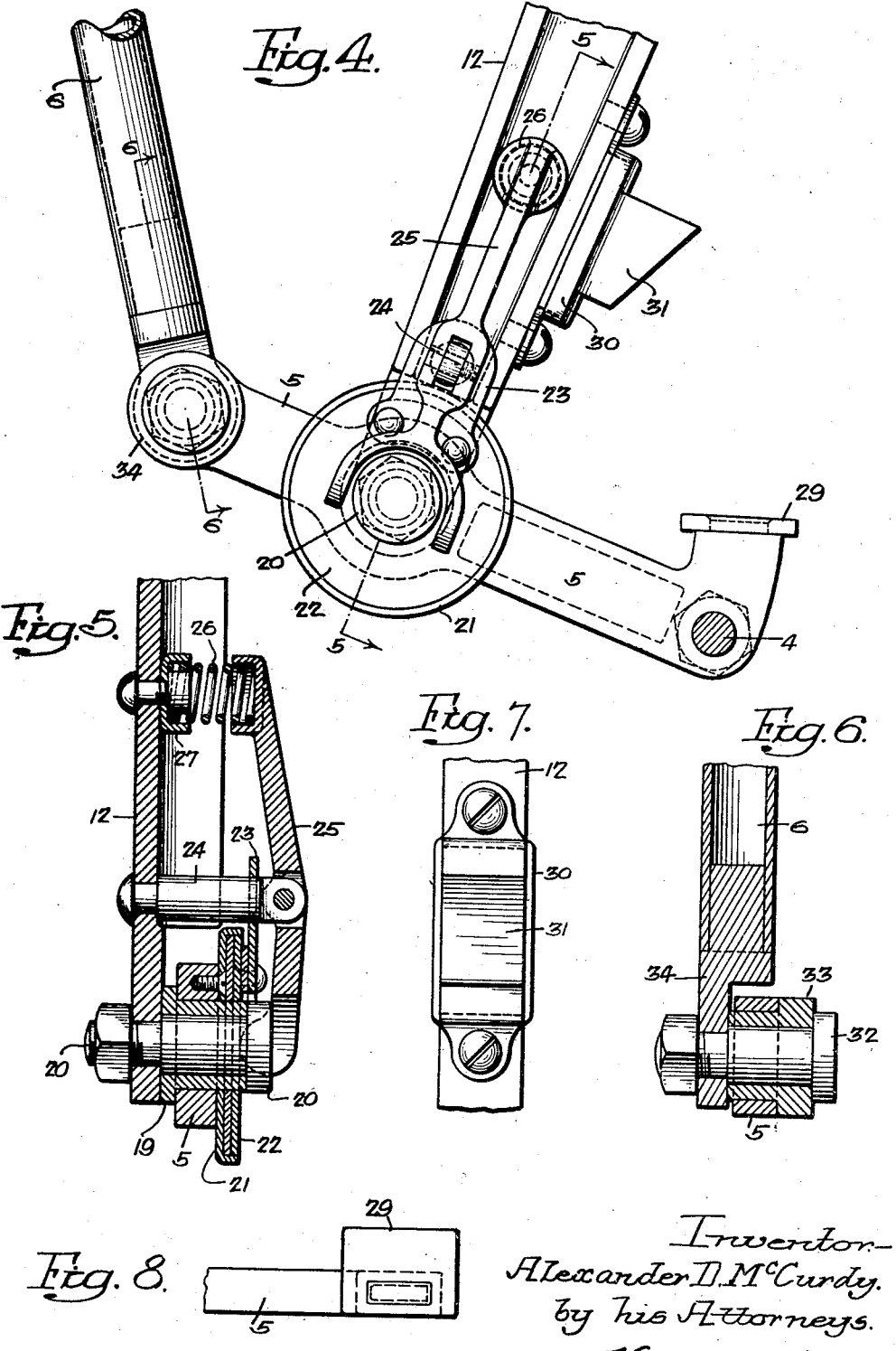

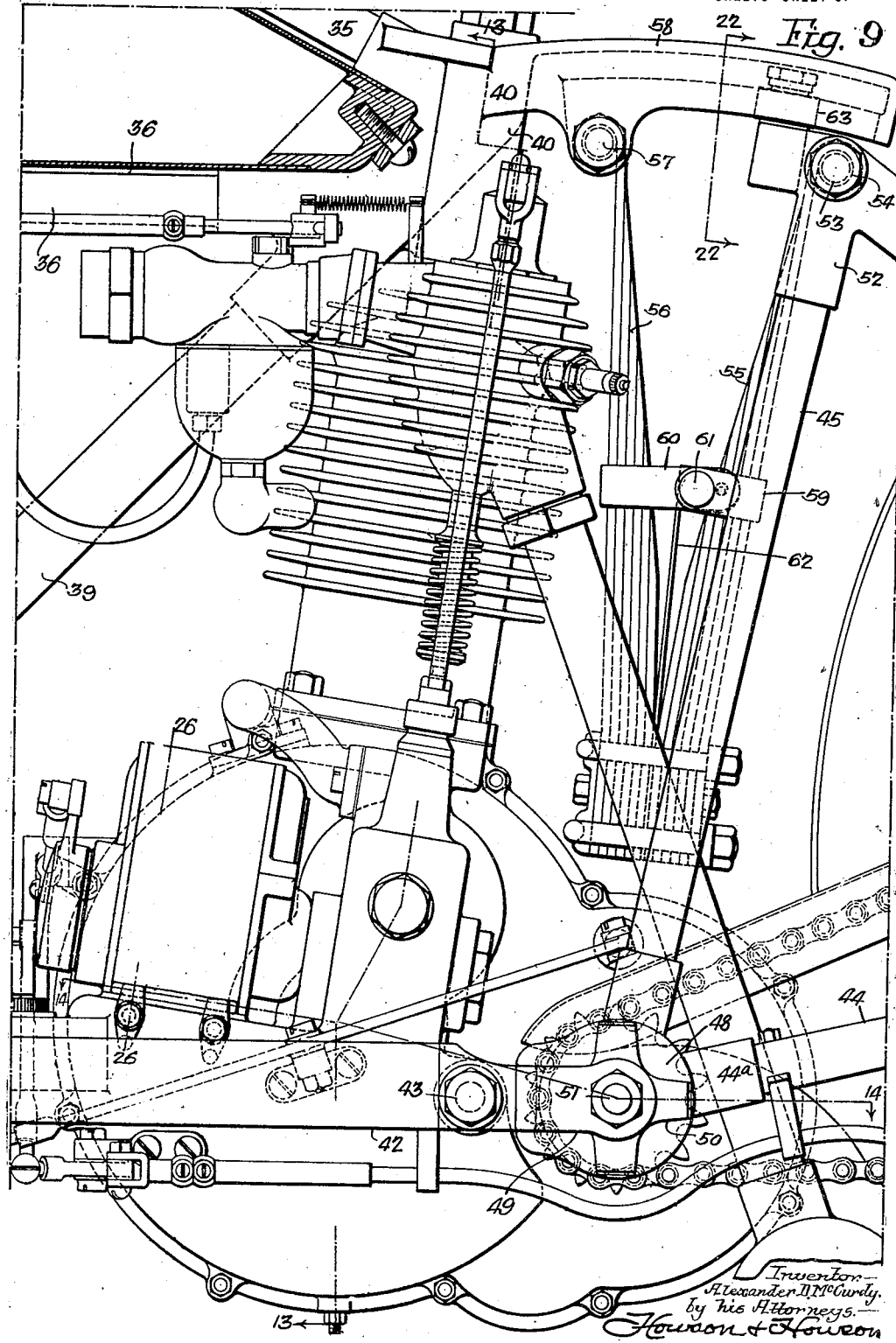

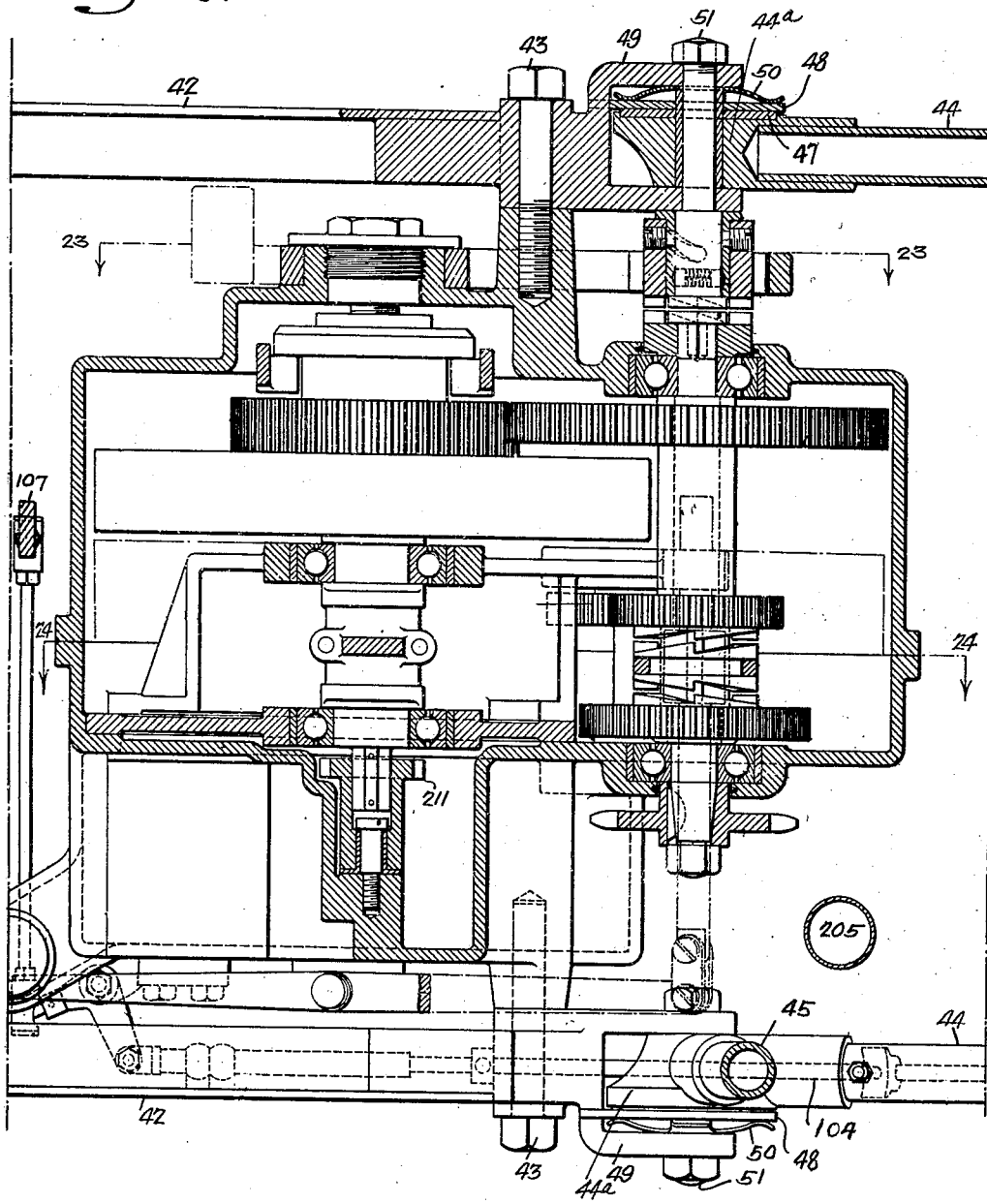

ALEXANDER D. McCURDY, OF PHILADELPHIA, PENNSYLVANIA.

MOTORCYCLE.

1,316,455.     Specification of Letters Patent.     Patented Sept. 16, 1919.

Application filed September 27, 1916. Serial No. 122,422.

*To all whom it may concern:*

Be it known that I, ALEXANDER D. MC-CURDY, a citizen of the United States, residing in Philadelphia, Pennsylvania, have invented Motorcycles, of which the following is a specification.

One object of my invention is to provide a motorcycle which among other features shall include a novel construction of frame and frame members, together with novel means for supporting said frame from the wheels with a view to making the machine as a whole ride easily and preventing shocks, due to its passage over obstructions, being transmitted to the rider.

The invention also contemplates novel front and rear spring supporting means for the frame, together with a novel arrangement of parts constituting the front fork and the parts associated therewith.

I further desire to provide a novel arrangement and construction of shock absorbers at certain portions of the frame with a view to preventing transmission of violent shocks therethrough.

These objects and other advantageous ends I secure as hereinafter set forth, reference being had to the accompanying drawings, in which, Figure 1 is a side elevation of a motorcycle constructed according to my invention;

Fig. 2 is an elevation, partly in vertical section, illustrating the detail construction of the upper part of the front fork with its associated members;

Fig. 3 is a front elevation, partly in section, of the parts shown in Fig. 2;

Fig. 4 is a fragmentary elevation, partly in section, of the lower part of the front fork;

Figs. 5 and 6 are sections on the lines 5—5 and 6—6, respectively, Fig. 4;

Fig. 7 is an elevation of the buffer shown in Fig. 4;

Fig. 8 is a plan of the buffer-engaging portion of one of the bottom fork levers which coacts with the buffer;

Fig. 9 is a side elevation partly in section, illustrating primarily the means for connecting the two sections of the frame structure; and Fig. 10 is a horizontal section on the line 14—14, Fig. 9.

In the above drawings 1 and 2 respectively represent front and rear wheels, of which the first has a hub 3 of the ordinary construction and is rotatable about an axle spindle 4 to whose opposite ends are fixed a pair of levers 5. The opposite ends of these levers are respectively pivoted to tension rods 6 whose upper ends are rigidly fixed to a cross member 7 hinged or pivoted to the forward extremity of a leaf spring 8. The opposite end of said spring is rigidly bolted to a second cross member 9 which carries an upwardly extending tubular post 10 rotatably mounted in a casting 11 preferably made of aluminum or other suitable material and forming the forward head of the motorcycle frame.

The forward ends of the cross member 9 are rigidly fixed to or integral with a pair of fork members 12 extending on opposite sides of the front wheel 1 and pivotally connected to the levers 5 respectively. The upper ends of the fork bars 12 are connected by screws to a transversely extending member 13 to whose opposite ends are rigidly connected the handle bars 14 and 15, the central part of this structure being made tubular for the reception of a bolt 10ª threaded into the tubular post 10. Two sets of anti-friction bearings 16 and 17 are mounted respectively between the head structure 11, the cross head member 9 and a collar 18 threaded on the upper end of the tubular post 10.

As shown in Figs. 4 and 5, I provide a special form of shock absorber between each of the levers 5 and their respective fork bars 12 and for this purpose I mount in suitable openings in each of said levers a bearing bushing 19 which in turn is rotatably mounted on a stud 20 rigidly fixed to the lower end of the fork bar 12. Each of the levers 5 has rigidly held to it concentrically with the stud 20 and sleeve 19 a flanged disk 21, within which is loosely mounted a ring of friction material such as leather, fiber or the like. Also extending within the annular space formed by the flange of said part 21 is a metal ring 22 to which is fixed a plate 23 having an opening for the passage of a fulcrum stud 24 which projects from the lower end of the fork bar 12 adjacent the stud 20.

Pivoted to the free end of the stud 24 is a lever 25 whose lower end is forked and so proportioned as to rest upon the outer face of the metal ring 22 of the shock absorber under the action of a spring 26 mounted between its cup-shaped upper end and a cup 27 fixed to the fork bar 12; it being noted that both of said bars are preferably of channel section.

In order to prevent damage or excessive shock in case of an abnormal movement of the levers 5 about the axle 4, I provide on each of said levers immediately over the axle a buffer plate 29 and on each of the fork bars 12 place a metal holder 30 in which is mounted a body of rubber 31 so formed as to be engaged by the buffer plate when, as above noted, there is such angular movement of the levers and therefore of the fork bars as would cause these parts to engage each other.

In Fig. 6, I have illustrated the preferred form of connection between each of the levers 5 and the tension members 6, and this consists of a stud 32 rigidly mounted in each of said members and rotatably carrying a bushing 33 which is rigidly fixed in the extremity of the lever. As shown, the lower end of each of the tension bars 6 is reinforced by a solid metal head 34 which is cut away at one side to permit of the lever 5 being as nearly as possible in the line of stress of its bar.

The head 11 for the most part is made hollow for the reception of a speedometer and the control wires and has brazed or otherwise suitably fixed to it three tubular members 35, 36 and 37, of which the two first project horizontally and the other extends downwardly and rearwardly to a casting 38 to which it is also brazed. Said casting is connected by a tubular up- and rearwardly extending member 39 with a casting 40 at the upper part of the frame immediately adjacent the saddle 41, to which casting is also connected the rear end of the top frame member 35 as well as the intermediate frame member 36.

The frame casting 38 has bolted to it a horizontal, rearwardly extending, substantially U-shaped structure of angle iron 42 and this has its free extremities rigidly connected by bolts 43 to the crank case of the engine by which the motorcycle is driven. Beyond these bolts 43 the extremities of the member 42 have riveted to them a pair of castings 49 forked for the reception of the lower forward ends of a rear frame member, each side of which consists of a rearwardly extending bar 44, an upwardly extending bar 45 and an inclined bar 46 connected to or formed as part of said two bars 44 and 45.

As shown in Fig. 10, the forward end of each frame bar 44 and the lower end of the bars 45 are welded to a casting 44ᵃ which is slightly dished at its outer side for the reception of a washer 47 of leather or other friction material engaged by a metal ring 48, and this, as shown in Fig. 9, is provided with projections extending on opposite sides of one of the branches of the fork 49 in order to prevent it from rotating. A spring plate 50 acts between this ring 48 and the outer member of the fork 49 to press said ring toward the leather washer 47 and the casting 44ᵃ at the junction of the frame bars 44 and 45 so as to retard turning of the latter on the pivot bolt 51 whereby it is movably connected to the fork 49.

The upper ends of the rear frame members 45 and 46 on each side of the rear wheel 2 are welded to a casting 52, and both of said castings are rigidly connected by a transversely extending bolt 53 so that the two frames 44—45—46 are rigidly connected and operate together. The two castings 52 are maintained at a fixed distance apart on said bolt by a bushing 54 on which is journaled the upper end of a leaf spring 55 whose lower end is rigidly connected to the lower end of a second leaf spring 56. The upper end of this latter is similarly journaled on a pivot bolt 57 extending between opposite sides of a rearward projection 58 forming part of the casting 40, and in order to prevent undue separation of the central portions of said two springs in case of violent shock, I provide them with straps 59 and 60 whose ends are pivotally connected by a pin 61 which is engaged by a supporting plate 62 clamped between the lower ends of said springs so as to retain said straps in the desired position.

The rearward extension 58 of the casting 40 has a channel section and is designed to serve as a guideway for the castings 52 and hence for the rear frame structure, for which purpose each of said castings carries a roller 63 operative upon the inner vertical surface of a flange of said structure. With this arrangement of parts the rear frame structure, consisting of the two sets of members 44—45—46, is free to pivot on the bolt 51 so that its top portion moves toward and from the main portion of the casting 40 while being prevented from side twisting and properly held in line with the remainder of the frame of the machine by the rollers 63 and part 58 of the casting.

It is particularly to be noted that with a machine of the construction above described, no serious shocks are transmitted to the driver, by reason of the peculiar mounting and construction of the frame, and excessive vibration of the latter is effectually avoided by means of the shock absorbers provided for the front and rear wheel suspensions.

I claim:—

1. A motorcycle frame consisting of a main section having a downwardly opening guideway at the upper portion of its rear end; a rear frame section pivotally connected to the lower rear portion of said main frame and resilient means between said frame sections; with anti-friction members mounted on the upper portion of said rear section and operative in the guideway.

2. The combination in a motorcycle of a frame consisting of two sections; means pivotally connecting the lower portions of said sections; front and rear wheels mounted respectively in said sections; and a leaf spring made in two parts connected together at one end and having their opposite ends respectively connected to said frame sections in positions to oppose relative movement thereof.

3. The combination in a motorcycle of a frame consisting of two sections; means pivotally connecting the lower portions of said sections; front and rear wheels mounted respectively in said sections; a leaf spring made in two sections rigidly connected at their large ends and at their small ends connected to the frame members respectively; and a clip supported adjacent the middle portions of said sections to limit their separation.

4. The combination in a motorcycle of a frame made in two sections pivotally connected at their lower parts; a spring normally maintaining their upper parts in definite positions and extending downwardly therefrom; with means for guiding one of the frame sections on the other when it moves in opposition to the spring.

5. The combination in a motorcycle of two parallel bars constituting a fork structure; a handle bar rigidly connecting the upper ends of said bars; a cross bar also connecting said bars at a point below the handle bar; a spindle extending between said handle bar and the cross bar; a frame including a head journaled on said spindle; wheels for supporting the fork structure and the frame respectively; a spring projecting forwardly from the cross bar; levers carried by the wheel and engaged by the bars of the fork structure; and tension members connecting said levers and the spring.

6. The combination in a motorcycle of a front wheel having an axle; levers connected to opposite ends of said axle; a fork structure having its branches respectively pivoted to said levers; a spring having one end rigidly connected to the fork structure and constituting its sole point of attachment thereto; with tension members connecting the levers and the second end of the spring.

7. The combination in a motorcycle of a front wheel having an axle; pivot levers respectively connected to opposite ends of said axle; two rigidly connected substantially parallel members constituting a fork connected to said levers; a handle bar connected to said fork; tension members respectively connected to the two levers; and a spring engaged solely at its ends of which one is connected to said members and the other is connected to the fork.

8. The combination in a motorcycle of front and rear wheels; a main frame structure carried thereby and including a head; a fork structure having a post rotatably engaging said head; a leaf spring having a thick end directly connected to the fork structure immediately adjacent the head and projecting forwardly therefrom; a pair of links connected to the lighter end of said spring; with a pair of levers supported by the front wheel and fulcrumed on the fork structure, said levers being respectively connected to the links.

9. The combination in a motor cycle of a fork structure; levers respectively pivoted to the branches of said structure and fulcrumed on the front wheel; resilient means for opposing relative movement between the levers and the fork structure; levers respectively fulcrumed to said branches; friction elements acted on by each of said latter levers; and a spring operative on each of said levers to cause them to press the friction element together to retard relative movement of the branches of the fork structure and the levers pivoted thereto.

10. The combination in a motorcycle of a fork structure; levers respectively pivoted to the branches of said structure and fulcrumed on the front wheel; with friction means opposing relative movement of the levers and the fork structure.

11. The combination in a motorcycle of a fork structure; bars pivoted to the branches of said structure and fulcrumed on the front wheel; with friction means opposing relative movement of the bars and the fork structure consisting of levers fulcrumed on the branches of said structure respectively and friction material between one arm of each lever and the adjacent branch of the fork structure.

12. The combination in a motorcycle of a main frame including front and rear heads; top and intermediate members extending between said heads; a front member extending downwardly from the front head; a bottom member connected to the front member; a brace member extending from the junction of the front and bottom members to the rear head; a rear member connecting the bottom member and the rear head; and a triangular auxiliary frame having one apex pivoted to the bottom member and a second apex movably engaging the rear head.

13. The combination in a motorcycle of a main frame including front and rear heads; top and intermediate members extending between said heads; a front member extending downwardly from the front head; a bottom member connected to the front member; a brace member extending from the junction of the front and bottom members to the rear head; with an auxiliary frame pivoted to the bottom member and guided by the rear head.

ALEXANDER D. McCURDY.

Copies of this patent may be obtained for five cents each, by addressing the "Commissioner of Patents, Washington, D. C."